United States Patent
Edmonds

(10) Patent No.: US 10,966,408 B1
(45) Date of Patent: Apr. 6, 2021

(54) ANIMAL ENCLOSURE AND DOOR ASSEMBLY

(71) Applicant: Edmonds Outdoors, LLC, Brentwood, TN (US)

(72) Inventor: Addison Edmonds, Brentwood, TN (US)

(73) Assignee: Edmonds Outdoors, LLC, Nashville, TN (US)

( * ) Notice: Subject to any disclaimer, the term of this patent is extended or adjusted under 35 U.S.C. 154(b) by 0 days.

(21) Appl. No.: 15/427,037

(22) Filed: Feb. 7, 2017

Related U.S. Application Data

(63) Continuation of application No. 29/539,652, filed on Sep. 16, 2015, now Pat. No. Des. 778,510.

(51) Int. Cl.
*A01K 1/02* (2006.01)
*A01K 1/03* (2006.01)
(Continued)

(52) U.S. Cl.
CPC ............ *A01K 1/034* (2013.01); *A01K 1/0035* (2013.01); *A01K 1/029* (2013.01); *A01K 1/0245* (2013.01);
(Continued)

(58) Field of Classification Search
CPC ...... A01K 1/02; A01K 1/0209; A01K 1/0227; A01K 1/0236; A01K 1/0245;
(Continued)

(56) References Cited

U.S. PATENT DOCUMENTS

| 138,111 A | 4/1873 | Adriaans |
| 823,544 A | 6/1906 | Parker |

(Continued)

FOREIGN PATENT DOCUMENTS

| CN | 12764148 Y | 3/2006 |
| CN | 102037899 A | 5/2011 |

(Continued)

OTHER PUBLICATIONS

PCT/US2014/049800, International Search Report, dated Nov. 21, 2014, 13 pages.

(Continued)

*Primary Examiner* — Thanh Pham
(74) *Attorney, Agent, or Firm* — Waller Lansden Dortch & Davis, LLP; Matthew C. Cox

(57) ABSTRACT

An animal enclosure includes a kennel body and a door assembly. The door assembly includes a door frame and a door pivotally attached to the door frame. The door frame is secured to the kennel body at an opening. The door is moveable between an open and a closed position. The door includes a first latch having a first latch bolt engaging the door frame at a first latch location. The door also includes a second latch having a second latch bolt engaging the door frame at a second latch location. The door also includes a third latch having a third latch bolt engaging the door frame at a third latch location. In some embodiments, the first latch bolt extends horizontally toward the door frame, and the second and third latch bolts extend substantially vertically from the door toward the door frame in opposite directions.

23 Claims, 15 Drawing Sheets

(51) Int. Cl.
  *A01K 1/00* (2006.01)
  *E05C 1/10* (2006.01)
  *E05C 21/00* (2006.01)
  *E05B 65/06* (2006.01)
  *E05B 65/02* (2006.01)
  *E05B 65/52* (2006.01)

(52) U.S. Cl.
  CPC ............ *A01K 1/0272* (2013.01); *E05B 65/02* (2013.01); *E05B 65/06* (2013.01); *E05C 1/10* (2013.01); *E05C 21/00* (2013.01); *E05B 65/5238* (2013.01)

(58) Field of Classification Search
  CPC .... A01K 1/0272; A01K 1/0281; A01K 1/029; A01K 1/03; A01K 1/031; A01K 1/032; A01K 1/033; A01K 1/034; A01K 1/035
  See application file for complete search history.

(56) References Cited

U.S. PATENT DOCUMENTS

| | | | |
|---|---|---|---|
| 1,020,349 A | 3/1912 | Havard | |
| 2,217,871 A | 12/1940 | Lundgren | |
| 2,313,591 A | 3/1943 | Samuel | |
| 2,464,709 A | 3/1949 | Nello | |
| 2,544,505 A | 3/1951 | Semen | |
| 2,790,414 A | 4/1957 | Rossow | |
| 3,536,044 A | 10/1970 | Stephens | |
| 3,724,025 A | 4/1973 | Hicks | |
| 3,785,344 A | 1/1974 | Patterson | |
| 4,016,833 A | 4/1977 | Ray | |
| 4,090,472 A | 5/1978 | York | |
| 4,339,147 A | 7/1982 | Kimzey | |
| 4,525,952 A * | 7/1985 | Cunningham | E05B 15/0205 292/340 |
| 4,561,526 A | 12/1985 | Winter | |
| 4,575,109 A | 3/1986 | Cowdery | |
| 4,696,259 A | 9/1987 | Fewox | |
| 4,852,520 A | 8/1989 | Goetz | |
| 4,917,047 A * | 4/1990 | Wazeter, III | A01K 1/03 119/474 |
| D308,429 S | 6/1990 | Van Skiver | |
| D308,588 S | 6/1990 | Goetz | |
| D312,333 S | 11/1990 | Van Skiver | |
| D314,251 S | 1/1991 | Van Skiver | |
| 5,154,137 A | 10/1992 | Stanaland | |
| 5,154,265 A | 10/1992 | Capistrant | |
| 5,168,829 A | 12/1992 | Dietrich | |
| D334,087 S | 3/1993 | Goetz | |
| 5,220,882 A | 6/1993 | Jenkins | |
| 5,253,612 A | 10/1993 | Goetz | |
| D351,688 S | 10/1994 | Northrop et al. | |
| 5,357,900 A | 10/1994 | Ho | |
| D352,573 S | 11/1994 | Sampson et al. | |
| 5,373,708 A | 12/1994 | Dumoulin | |
| 5,467,734 A | 11/1995 | Ho | |
| 5,669,331 A | 9/1997 | Richmond | |
| 5,701,843 A | 12/1997 | Lazides | |
| 5,727,503 A | 3/1998 | Whittaker | |
| 5,911,763 A * | 6/1999 | Quesada | E05C 9/043 292/36 |
| 5,931,120 A | 8/1999 | Burns | |
| 5,934,425 A | 8/1999 | Sadow | |
| 6,021,740 A | 2/2000 | Martz | |
| D426,680 S | 6/2000 | Morley | |
| 6,095,088 A | 8/2000 | Savicki | |
| 6,223,691 B1 | 5/2001 | Beattie | |
| 6,230,656 B1 | 5/2001 | Walach | |
| D445,222 S | 7/2001 | Ross | |
| 6,345,591 B1 | 2/2002 | Richmond | |
| 6,446,577 B1 | 9/2002 | Salahor | |
| D470,628 S | 2/2003 | Kinder et al. | |
| D471,676 S | 3/2003 | Kinder et al. | |
| 6,571,740 B1 | 6/2003 | Kinder et al. | |
| 6,698,812 B1 | 3/2004 | Stubbs | |
| 6,732,676 B1 | 5/2004 | Smith | |
| 6,766,769 B1 | 7/2004 | Doyle | |
| 7,025,394 B1 * | 4/2006 | Hunt | E05C 9/021 292/142 |
| 7,070,190 B2 | 4/2006 | Sadow | |
| 7,036,458 B1 | 5/2006 | Stornant | |
| 7,090,242 B1 | 8/2006 | Sheinall | |
| D529,666 S | 10/2006 | Simpson | |
| 7,152,554 B2 | 12/2006 | Crawford | |
| D538,942 S | 3/2007 | Grundy | |
| D545,507 S | 6/2007 | Harper et al. | |
| D546,005 S | 7/2007 | Harper et al. | |
| D551,399 S | 9/2007 | Harper et al. | |
| D555,292 S | 11/2007 | Harper et al. | |
| 7,261,060 B1 | 12/2007 | Garofola | |
| 7,334,802 B2 | 2/2008 | Kaplan | |
| D566,907 S | 4/2008 | Barca | |
| D571,053 S | 6/2008 | Donnelly | |
| D571,054 S | 6/2008 | Donnelly | |
| D574,559 S | 8/2008 | You et al. | |
| D583,108 S | 12/2008 | Richardson | |
| D584,458 S | 1/2009 | You et al. | |
| D611,201 S | 3/2010 | Jakubowski et al. | |
| D611,202 S | 3/2010 | Jakubowski et al. | |
| D615,251 S | 5/2010 | Scherbing | |
| D617,958 S | 6/2010 | Benincasa et al. | |
| 7,802,540 B2 | 9/2010 | Jakubowski | |
| 8,127,715 B2 | 3/2012 | Leung | |
| 8,127,719 B2 | 3/2012 | Jakubowski et al. | |
| D659,294 S | 5/2012 | Veness et al. | |
| D671,691 S | 11/2012 | Neilan | |
| 8,336,500 B1 | 12/2012 | Britt | |
| D680,696 S | 4/2013 | Hammel | |
| 8,408,416 B2 | 4/2013 | Cheng-Lung et al. | |
| 8,413,472 B2 | 4/2013 | Chiang | |
| D692,621 S | 10/2013 | Ganahl | |
| 8,544,417 B2 | 10/2013 | Sangl et al. | |
| D696,473 S | 12/2013 | Ganahl | |
| 8,613,260 B2 | 12/2013 | Veness | |
| D703,876 S | 4/2014 | Chance et al. | |
| 8,733,292 B2 | 5/2014 | Nichols | |
| 8,757,095 B2 | 6/2014 | Farmer et al. | |
| D713,099 S | 9/2014 | Chance et al. | |
| D717,005 S | 11/2014 | Skaggs | |
| D720,503 S | 12/2014 | Lloyd | |
| 9,119,375 B2 | 9/2015 | Flannery et al. | |
| 9,370,165 B2 | 6/2016 | de Bien | |
| 9,392,766 B1 | 7/2016 | Elden | |
| D808,596 S | 1/2018 | Veness | |
| D823,544 S | 7/2018 | Nguyen | |
| D827,211 S | 8/2018 | Cronkhite | |
| D827,212 S | 8/2018 | Cronkhite | |
| 2002/0113389 A1 | 8/2002 | Robinson | |
| 2004/0016409 A1 | 1/2004 | Schwinghammer et al. | |
| 2004/0026935 A1 | 2/2004 | Tang | |
| 2004/0065270 A1 | 4/2004 | King | |
| 2004/0134444 A1 | 7/2004 | Shiever et al. | |
| 2004/0194723 A1 | 10/2004 | Farmer | |
| 2005/0103279 A1 | 5/2005 | Brewer | |
| 2005/0241593 A1 | 11/2005 | Kaura | |
| 2005/0284399 A1 | 12/2005 | Asma | |
| 2006/0048716 A1 | 3/2006 | Garofola | |
| 2006/0169218 A1 | 8/2006 | Chang | |
| 2007/0056524 A1 | 3/2007 | Barca | |
| 2007/0157890 A1 | 7/2007 | Kaura | |
| 2007/0278755 A1 | 12/2007 | Jack | |
| 2008/0022938 A1 | 1/2008 | Callan | |
| 2008/0245313 A1 * | 10/2008 | Jakubowski | A01K 1/0245 119/497 |
| 2009/0011210 A1 | 1/2009 | Gao | |
| 2009/0101075 A1 | 4/2009 | Matlack | |
| 2009/0205578 A1 | 8/2009 | Alves | |
| 2009/0223461 A1 | 9/2009 | Trunnell et al. | |
| 2010/0043720 A1 | 2/2010 | Yelverton | |
| 2010/0066041 A1 | 3/2010 | Metzger | |
| 2010/0192870 A1 | 8/2010 | Wood | |
| 2010/0282179 A1 | 11/2010 | Ho | |
| 2011/0220033 A1 | 9/2011 | Sangl et al. | |

(56) References Cited

U.S. PATENT DOCUMENTS

| | | | |
|---|---|---|---|
| 2012/0037083 A1 | 2/2012 | Greene | |
| 2013/0055962 A1* | 3/2013 | Scoggins | A01K 13/001 119/453 |
| 2013/0220231 A1 | 8/2013 | Hovsepian | |
| 2013/0233250 A1 | 9/2013 | Veness et al. | |
| 2014/0083366 A1 | 3/2014 | Veness | |
| 2014/0137483 A1 | 5/2014 | Tong | |
| 2014/0216356 A1* | 8/2014 | Glover | A01K 1/0245 119/501 |
| 2015/0034018 A1 | 2/2015 | Edmonds | |
| 2015/0125250 A1 | 5/2015 | Sindlinger | |
| 2016/0192614 A1 | 7/2016 | Hawk | |
| 2016/0192615 A1 | 7/2016 | Parness | |

FOREIGN PATENT DOCUMENTS

| | | |
|---|---|---|
| FR | 2496401 | 6/1982 |
| FR | 2815817 | 5/2002 |
| FR | 2974972 | 11/2012 |
| GB | 503104 | 3/1939 |
| GB | 1260572 | 1/1972 |
| WO | 9918317 A1 | 4/1999 |
| WO | 2015021053 | 2/2015 |

OTHER PUBLICATIONS

"Alumni Profile: Addison Edmonds". Found on line Jun. 22, 2016 at olemissalumni.com. Page dated Mar. 1, 2015. Retrieved from http://www.olemissalumni.com/alumni-profile-addison-edmunds/.

"Dog Crate Door: How We Made it Stronger and Escape-Proof". Found on line Jun. 22, 2016 at gunnerkennels.com. Page dated Apr. 10, 2015. Retrieved from https://www.gunnerkennels.com/blog/dog-crate-door-how-we-made-it-stronger-and-escape-proof.

"Gunnar Kennel". Found on line Jun. 22, 2016 at youtube.com. Page dated May 14, 2015. Retrieved from https://www.youtube.com/watch?v=zoMMVAnhu30.

"Pet Travel Carriers and Crates-Crash Test Results". Found on line Jun. 22, 2016 at gopetfriendlyblog.com. Page dated 0713012015. Retrieved from http://www.gopetfriendlyblog.com/pet-travel-carriers-and-crates-crash-test-results/.

"ArcticShield Kennel Covers." Found on line Apr. 11, 2018 at www.youtube.com. Page dated Jul. 14, 2015. Retrieved from URL: https://www.youtube.com/watch?v=R3XSN-cPQSE (Year: 2015).

"Mud River Dixie Kennel Cover." Found on line Apr. 11, 2018 at www.amazon.com. Page dated Dec. 13, 2014. Retrieved from URL: https://goo.gl/XBrdqZ (Year: 2014).

"Classic Accessories Insulated Dog Kennel Jacket" Found on line Apr. 11, 2018 at www.amazon.com. Page dated Jul. 2, 2010. Retrieved from URL: https://www.amazon.com/classic-accessories-insulated-kennel-realtree/dp/b000pd8cck (Year: 2010).

U.S. Appl. No. 29/644,742, filed Apr. 20, 2018, assignee Edmonds Outdoors, LLC.

U.S. Appl. No. 15/011,453, filed Jan. 29, 2016, assignee Edmonds Outdoors, LLC.

U.S. Appl. No. 15/291,048, filed Oct. 11, 2016, assignee Edmonds Outdoors, LLC.

U.S. Appl. No. 16/285,095, filed Feb. 25, 2019, assignee Edmonds Outdoors, LLC.

U.S. Appl. No. 16/290,880, filed Mar. 2, 2019, assignee Edmonds Outdoors, LLC.

U.S. Appl. No. 16/290,885, filed Mar. 2, 2019, assignee Edmonds Outdoors, LLC.

U.S. Appl. No. 16/290,890, filed Mar. 2, 2019, assignee Edmonds Outdoors, LLC.

\* cited by examiner

ANIMAL ENCLOSURE AND DOOR ASSEMBLY

CROSS-REFERENCES TO RELATED APPLICATIONS

This application is a continuation of co-pending U.S. Design patent application Ser. No. 29/539,652 filed Sep. 16, 2015 entitled ANIMAL CRATE DOOR, of which is herein incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present invention relates generally to structures for housing animals and more particularly to portable pet kennels and pet crates. In some embodiments, the present invention relates to portable pet crates for housing or transporting dogs.

Various types of structural enclosures for storing and transporting animals are known in the art. Conventional portable animal crates such as those used for housing and transporting dogs typically include a plastic or metal wire construction and include an interior enclosure with a selectively openable door. Conventional portable animal crates generally include a single-layer construction such as a single layer of plastic, metal or wire mesh. The single-layer material forms the structural support and also defines the enclosure space within the interior of the crate. Conventional single-layer animal crates of this type are generally sized to easily fit in the bed of a truck or the cargo area of a sport-utility vehicle, and such crates are often used by sportsmen, disabled persons, rescue, military and/or law enforcement personnel for storing and transporting dogs. Such conventional portable animal crates provide a benefit of being relatively lightweight and portable such that a single person can lift and move the crate. Additionally, these types of conventional animal crates are generally sized to accommodate only the animal or animals to be housed within, thereby enhancing the portable nature of the product.

One problem with conventional animal crates is the door. Traditional doors for portable animal crates often include a spring-loaded latch that includes one or more posts that extend through a corresponding hole in the crate. Conventional doors for animal crates are also hinged between opposing posts on the opposite side of the door from the latch directly to the crate wall. Such conventional animal crate doors are often difficult to open and close, are susceptible to breakage during use, and are insufficient to retain an animal in the crate during an accident or during transport.

What is needed, then, are improvements to animal enclosures and specifically door assemblies for animal enclosures to address these and other problems.

BRIEF SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure provides an animal enclosure having numerous features to address one or more of the problems noted above.

Another aspect of the present disclosure provides an animal enclosure having a door assembly including a kennel body and a door frame attached to the kennel body. A door is pivotally attached to the door frame, and the door is moveable relative to the door frame and kennel body between a closed position and an open position. The door includes a first latch having a first latch bolt engaging the door frame, a second latch having a second latch bolt engaging the door frame, and a third latch having a third latch bolt engaging the door frame.

A feature of the animal enclosure includes a first latch that may be used to open and close the door relative to the door frame and kennel body, and second and third auxiliary latches that may be used to secure or lock the door relative to the frame when the door is in a closed position.

Yet another feature of the animal enclosure includes spacing between the first, second and third latches such that the first latch engages the latch side frame section of the door frame, the second latch engages the top frame section of the door frame, and the third latch engages the bottom frame section of the door frame. By providing three latch locations on the door frame, the door may be securely locked in a closed position when transporting an animal inside the enclosure.

A further aspect of the present disclosure provides an animal enclosure having a kennel body including an upper housing member and a lower housing member. The upper and lower housing members each include a double-walled construction including an inner wall forming a portion of the enclosure shaped to house the animal and an outer wall at least partially surrounding the inner wall, with a gap defined between the inner and outer wall. A door opening is defined at a first end of the kennel body between the upper and lower housing members, and a rear wall is defined at a second end of the kennel body opposite the door opening. A door frame is disposed on the kennel body at the door opening. A door is disposed on the door frame, and the door is pivotally attached to the door frame and is moveable between a closed position and an open position. The door includes a first latch having a first latch bolt engaging the door frame, a second latch including a second latch bolt engaging the door frame, and a third latch including a third latch bolt engaging the door frame.

Numerous other objects, advantages and features of the present disclosure will be readily apparent to those of skill in the art upon a review of the following drawings and description of a preferred embodiment.

DETAILED DESCRIPTION

Figure 1:
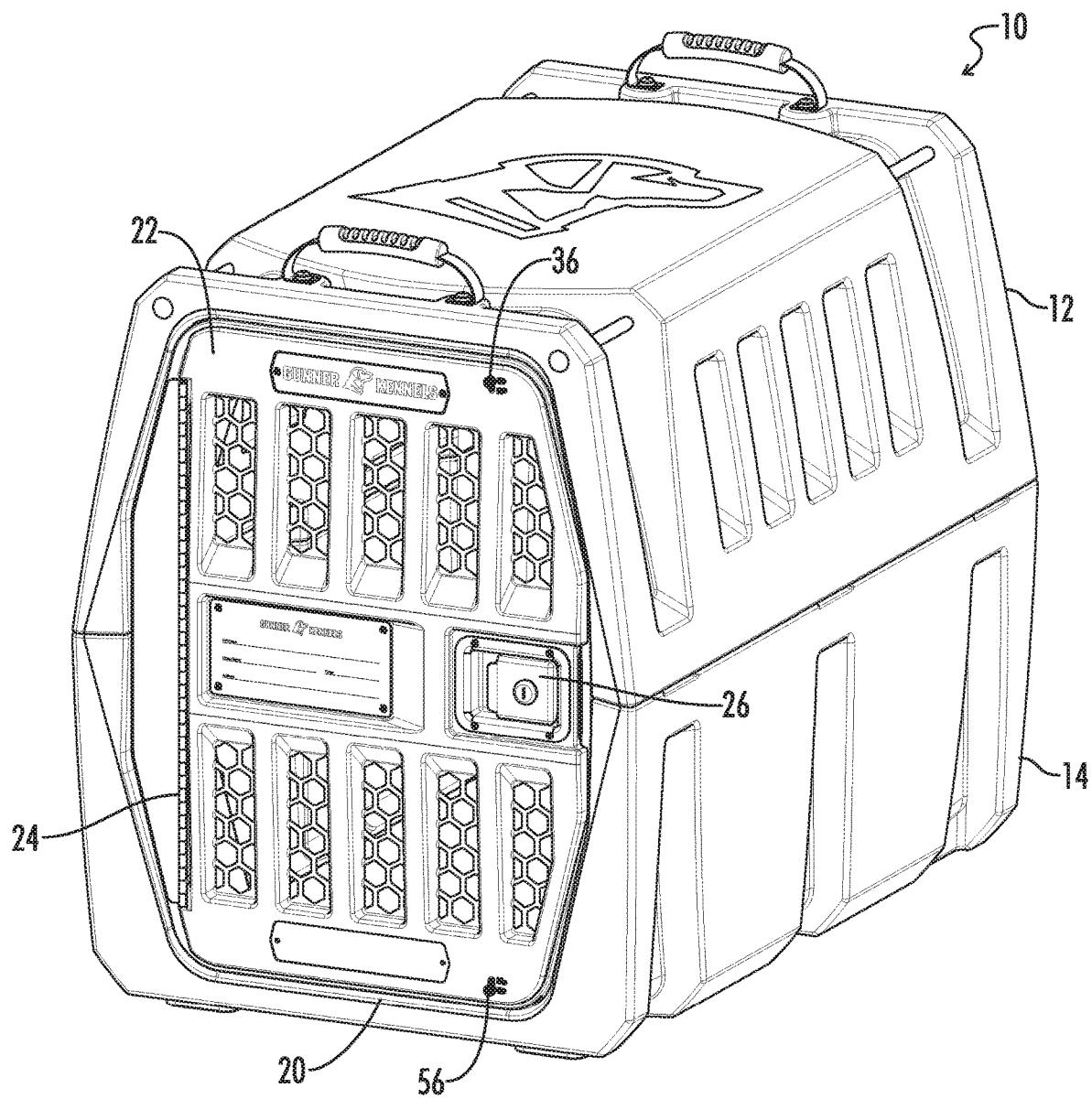
FIG. 1 is a perspective view of an embodiment of an animal enclosure having a door in accordance with the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Referring now to FIG. 1, an embodiment of an animal enclosure apparatus 10 is shown. The size and shape of kennel 10 allows kennel 10 to be easily transported from a residence or building to a vehicle or other mode of transportation. Additionally, in some embodiments, kennel 10 is portable and is shaped and sized to comply with one or more regulations for traveling with pets on commercial airlines.

Figure 2:
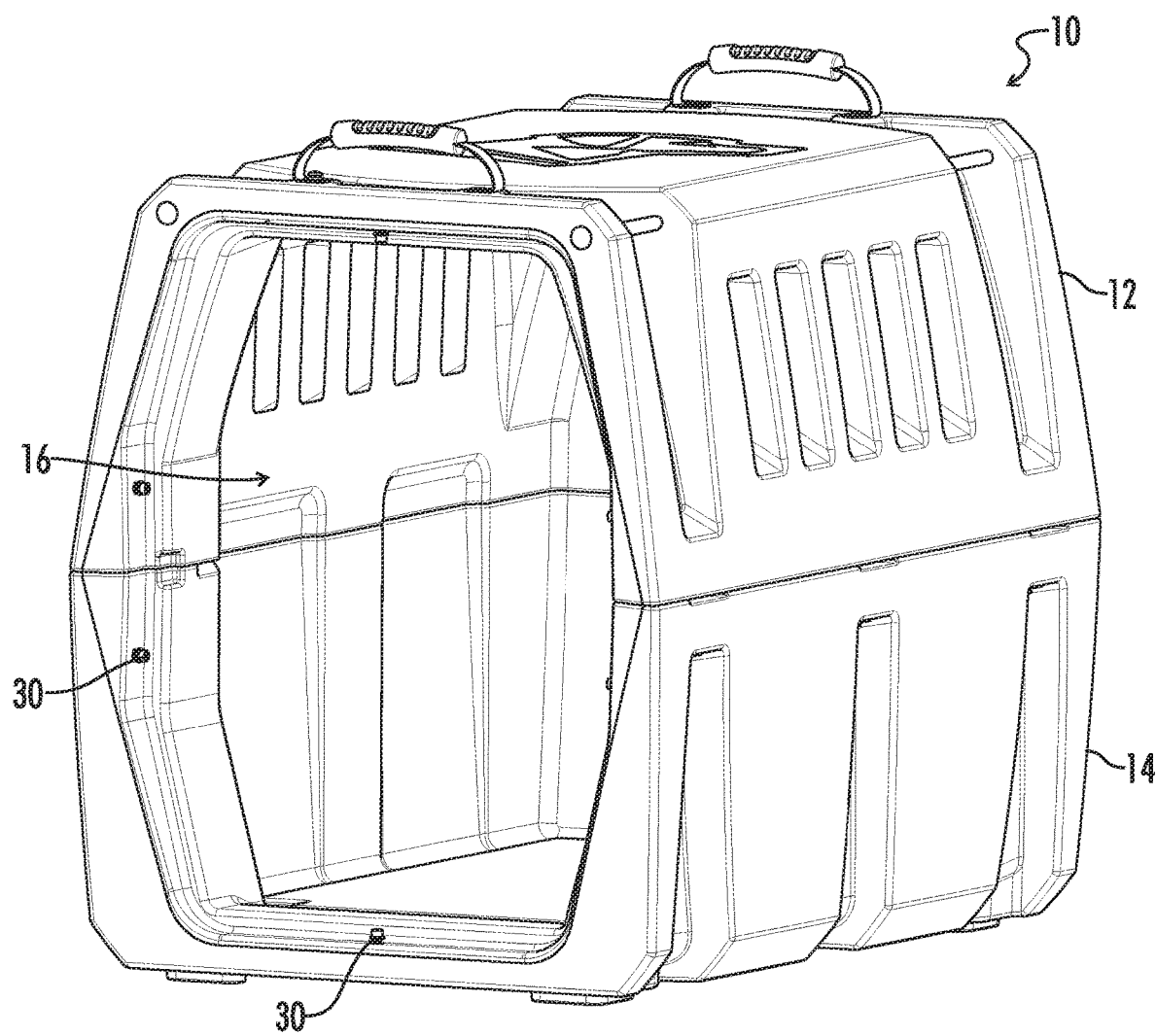
FIG. 2 is a perspective view of an embodiment of an animal enclosure having a door opening.

The animal enclosure apparatus 10, kennel, or animal crate, includes a kennel body having an upper housing member 12 and a lower housing member 14 in some embodiments, as shown in FIG. 1 and FIG. 2. In other embodiments, animal enclosure apparatus 10 includes a kennel body formed as a single piece.

Figure 3:
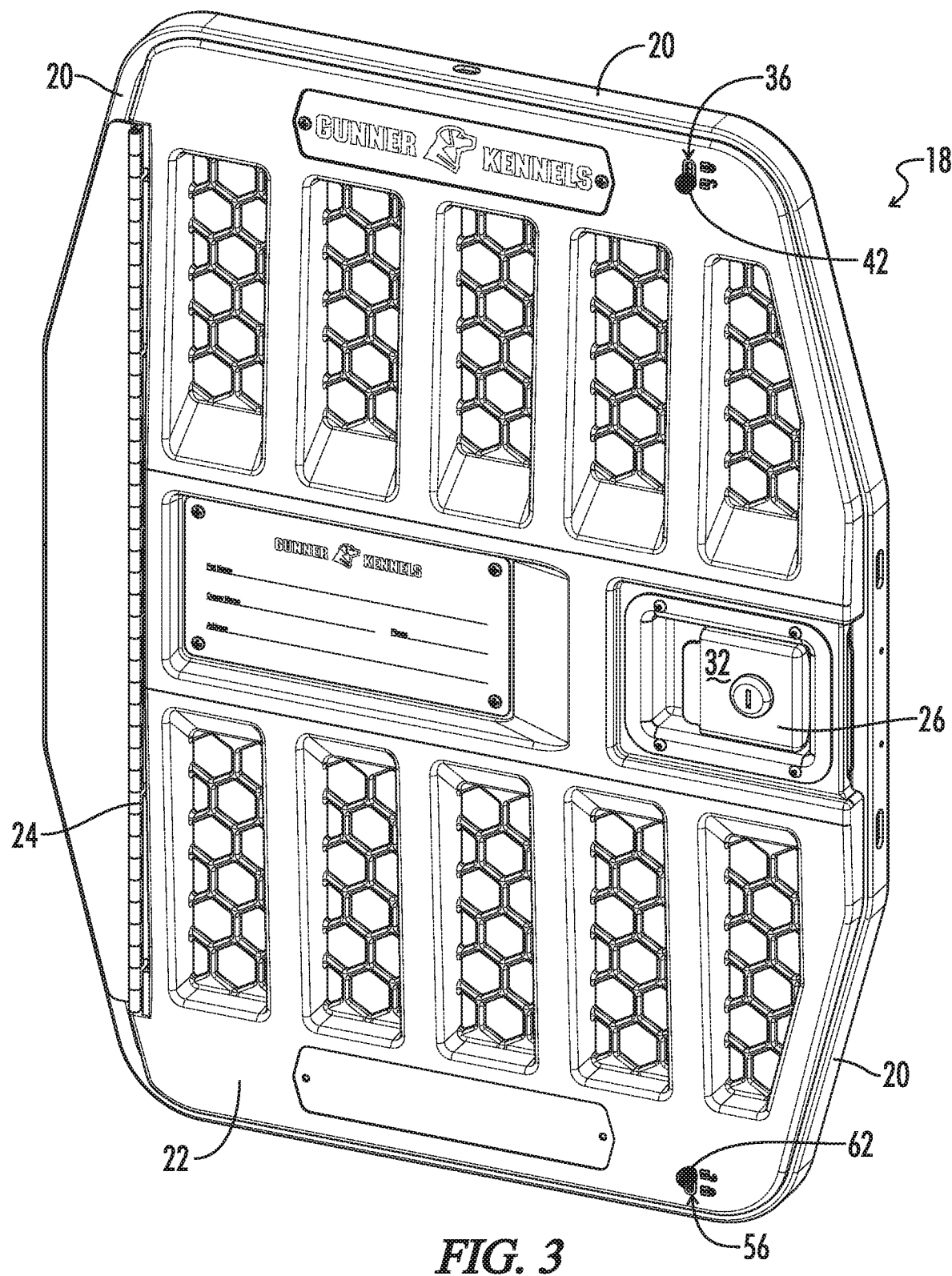
FIG. 3 is a front perspective view of an embodiment of a door assembly in accordance with the present disclosure.

In some embodiments, animal enclosure 10 includes a door opening 16 as shown in FIG. 2. Door opening 16 provides an opening for allowing animals to enter and exit the animal enclosure. As shown in FIG. 3, a door assembly 18 is disposed in door opening 16. The door assembly 18 includes a door frame 20 and a door 22 mounted on the door frame at a pivoting door hinge 24. The door frame 22 may be secured to the kennel body 12, 14 at the door opening 16 using one or more door frame fasteners 30, shown in FIG. 2. During use, the door 22 may be opened and closed relative to the kennel body and door frame 20. Door 22 is pivotally attached to door frame 20, and the door frame 20 stays attached to the kennel body via one or more door frame fasteners 30 as the door 22 is opened and closed.

Figure 7:
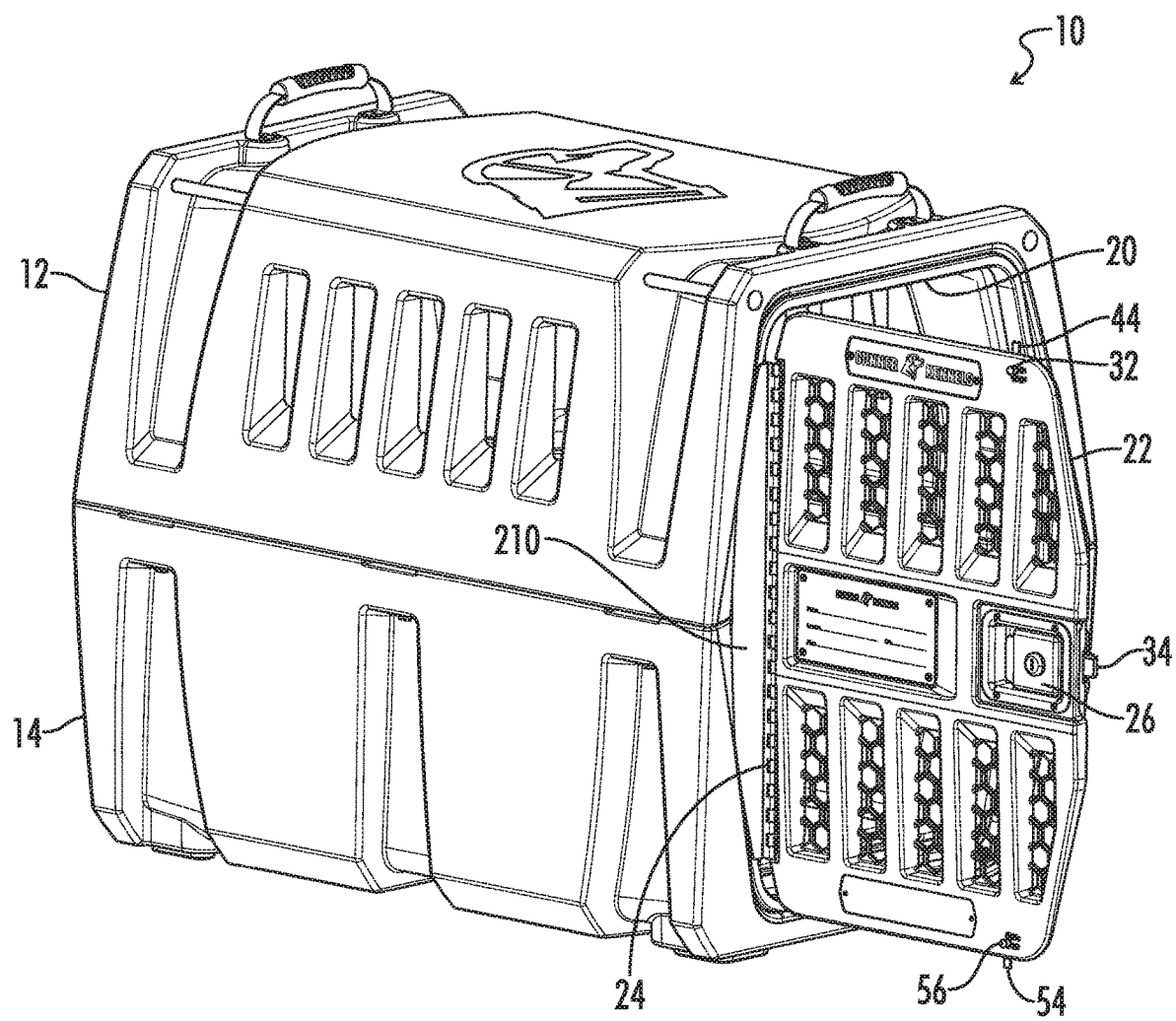
FIG. 7 is a perspective view of an embodiment of a door assembly with a door in an open position in accordance with the present disclosure.

Door 22 is moveable between a closed position, as seen in FIG. 1 and an open position, as seen in FIG. 7. Door 22 may be secured in the closed position using one or more latches. For example, as seen in FIG. 1, door assembly 18 includes a door 22 having a first latch 26, a second latch 36, and a third latch 56. Each latch provides an engagement between the door 22 and the door frame 20 to secure the door in a closed position. By releasing first latch 26, second latch 36 and third latch 56, a user may open door 22 to allow an animal to enter or exit the animal enclosure 10. A user may utilize only one latch, two latches or all three latches to secure the door 22 in a closed position. Each latch is generally moveable between a locked position and an unlocked position.

As shown in FIG. 3, in some embodiments, the door assembly 18 includes a door frame 20 and a door 22 mounted on door frame 20 via a pivoting hinge 24. Door 22 is angularly moveable relative to door frame 20 about hinge 24. First latch 26 includes a first latch handle 32 that a user may grasp to activate first latch 26. First latch handle 32 may include any suitable control for activating first latch 26, such as but not limited to a knob or a lever. Similarly, second latch 36 includes a second latch handle 42 that a user may grasp to activate second latch 36. Second latch handle may include any suitable control for activating second latch 36, such as but not limited to a knob or a lever. Third latch 56 includes a third latch handle 62 that a user may grasp to activate third latch 56. Third latch handle 62 may include any suitable control for activating third latch 56, such as but not limited to a knob or a lever.

Figure 4:
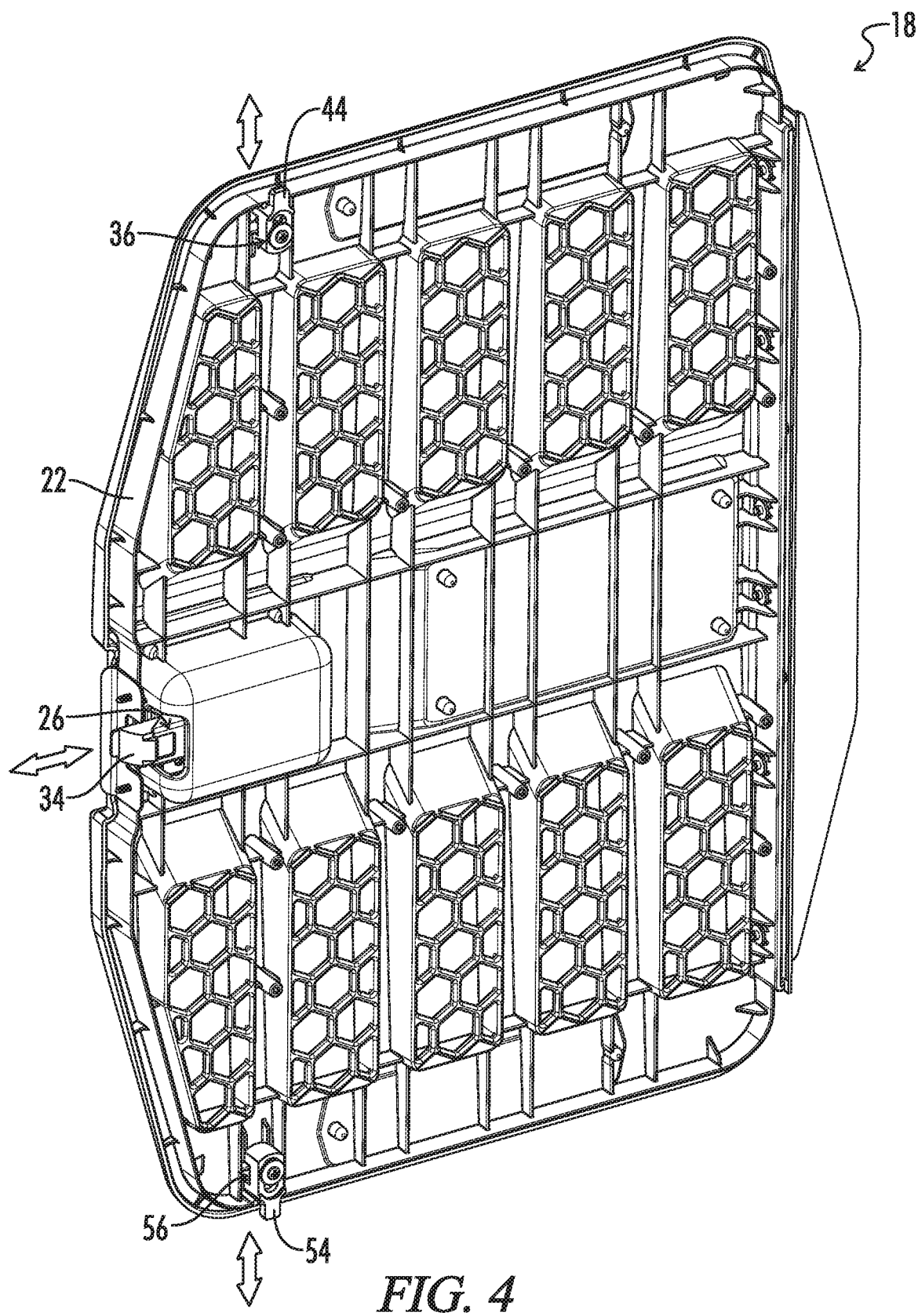
FIG. 4 is a rear perspective view of an embodiment of a door for attachment to a door frame in accordance with the present disclosure.

As shown in FIG. 4, each latch includes a corresponding bolt that engages the door frame to secure the latch in a closed position. For example, first latch 26 includes a first latch bolt 34 that extends back and forth from the door toward the door frame when the first latch 26 is activated by a user. First latch bolt 34 extends and retracts in a substantially horizontal orientation in some embodiments. Second latch 36 includes a second latch bolt 44 extending back and forth from door 22 relative to the frame when the second latch 36 is activated by a user. Second latch bolt 44 extends and retracts in a substantially vertical orientation in some embodiments. Third latch 56 includes a third latch bolt 54 extending back and forth from the door 22 toward the door frame when the third latch 56 is activated by a user. Third latch bolt 54 extends and retracts in a substantially vertical orientation in some embodiments. Additionally, in some embodiments, second latch bolt 44 and third latch bolt 54 each extend and retract along a common vertical reference axis, and first latch bolt 34 extends and retracts along a substantially horizontal reference axis perpendicular to the vertical reference axis in some embodiments.

Figure 5:
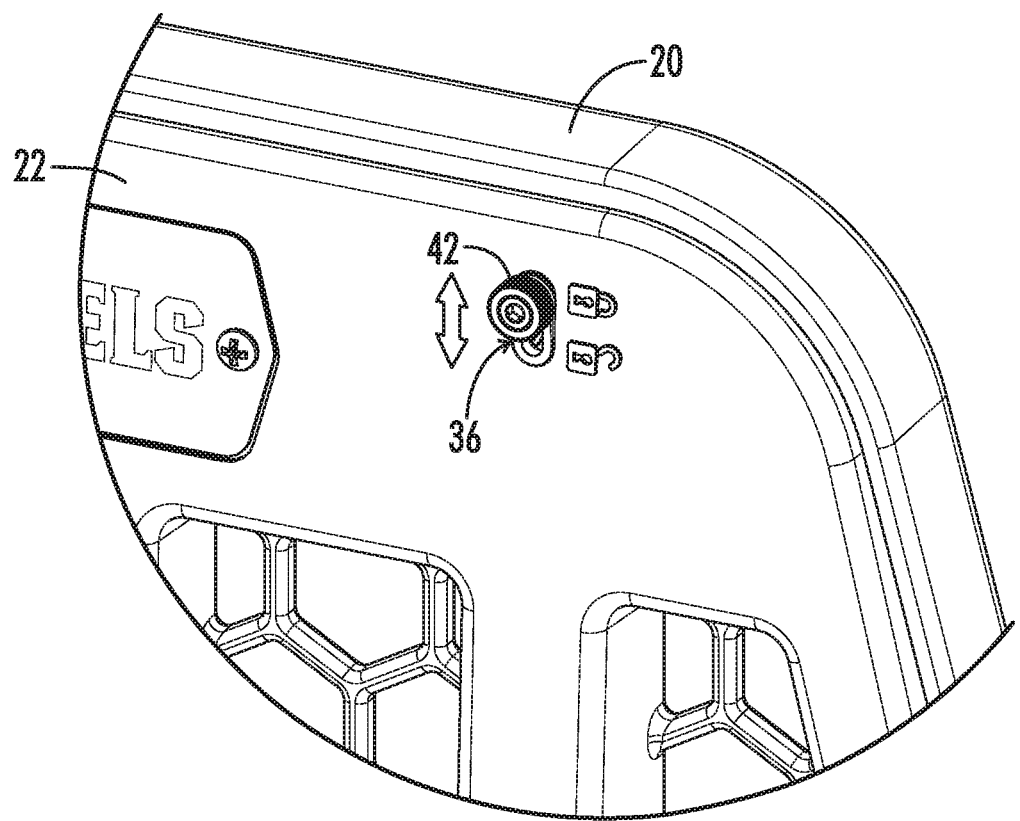
FIG. 5 is a front perspective view of an embodiment of a door assembly in accordance with the present disclosure.
Figure 6:
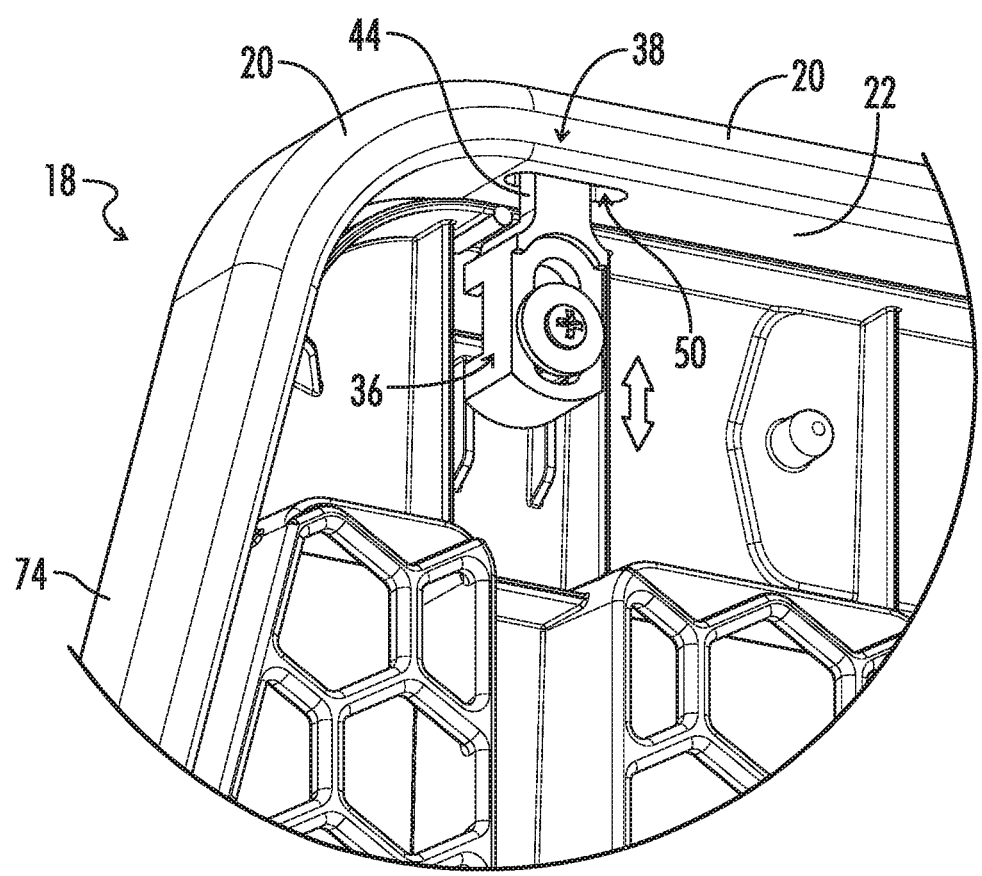
FIG. 6 is a rear perspective view of an embodiment of a door assembly in accordance with the present disclosure.

Each latch includes a latch handle that a user can grasp to operate the latch. As shown in FIG. 5, an exemplary embodiment of a second latch 36 includes a second latch handle 42. Second latch handle 42 extends from the face of door 22 and provides a structure for a user to manipulate to activate second latch 36. In this embodiment, second latch handle 42 includes a knob that is moveable up and down along a second latch track defined in door 22. Second latch handle 42 operates second latch bolt 44 between an unlocked position and a locked position, as seen in FIG. 6. In the locked position, second latch bolt 44 engages door frame 20 at a second latch location 38. Second latch location 38 is defined along top frame section 70 on frame 22 in some embodiments. As shown in FIG. 6, second latch bolt 44 slides upwardly toward frame 20, when second latch handle 42 is operated while the door 22 is in a closed position. Second latch bolt 44 may be slid into a local opening, or second latch recess 50, defined in frame 20. Second latch recess 50 defines a space shaped to accommodate a portion of second latch bolt 44. When second latch bolt 44 is received in second latch recess 50, second latch bolt 44 interferes mechanically with frame 20 in the event door 22 is attempted to be opened. In this capacity, second latch bolt 44 operates as a lock to prevent door 22 from being opened relative to frame 20. When second latch 36 is released by sliding second latch handle 42 away from frame 20, second latch bolt 44 retracts from second latch recess 50 and moves to an unlocked position. Second latch 36 may be operated independently of first latch 26 and third latch 56.

Figure 12:
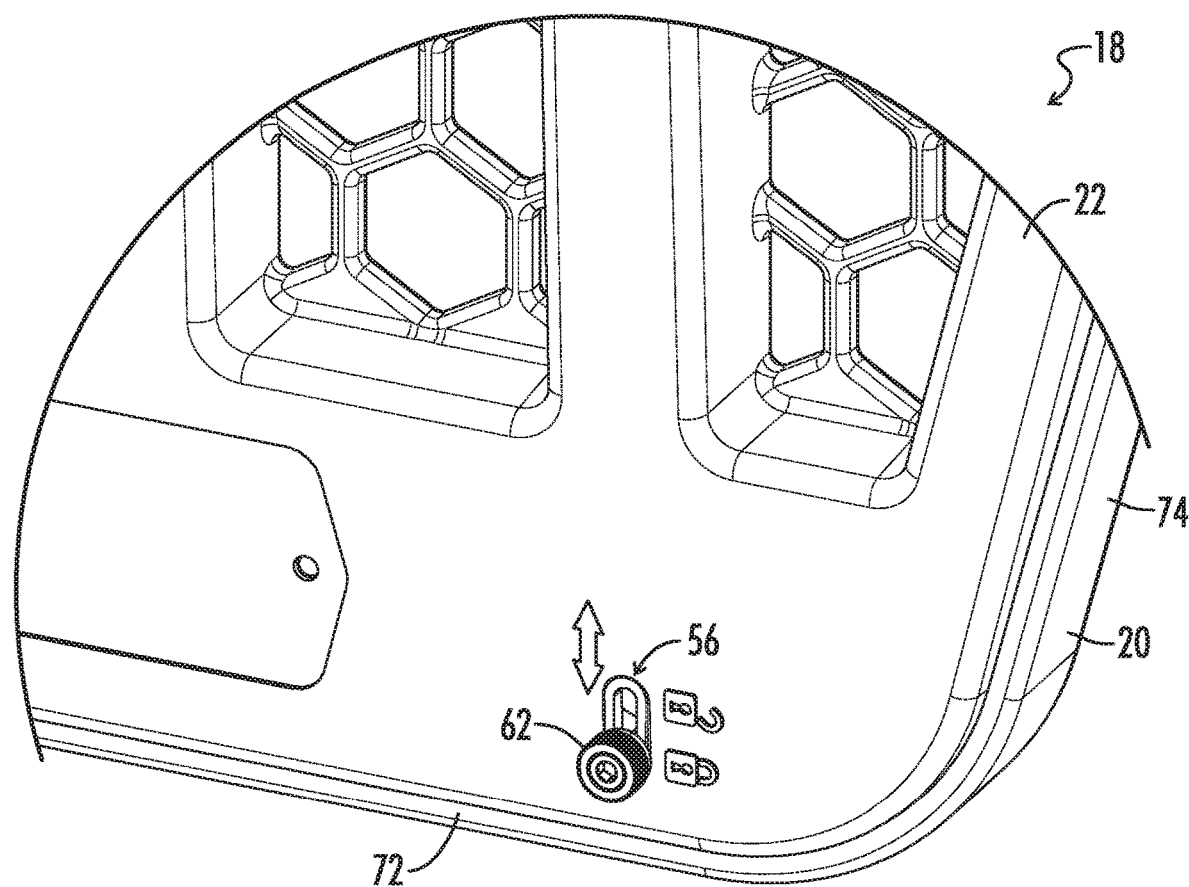
FIG. 12 is a front perspective view of an embodiment of a door assembly in accordance with the present disclosure.
Figure 13:
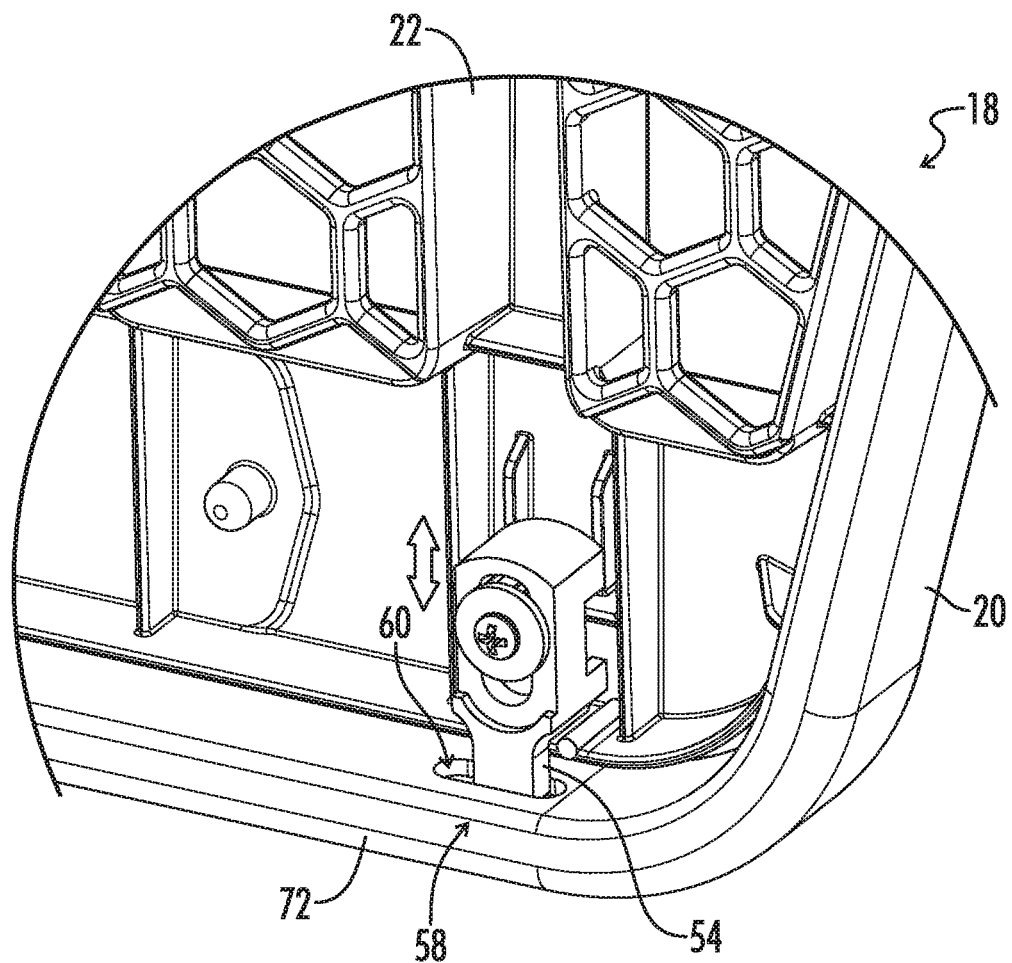
FIG. 13 is a rear perspective view of an embodiment of a door assembly in accordance with the present disclosure.

As seen in FIG. 7, additional latches may be positioned on the door 22. For example, third latch 56 includes a third latch bolt 54 protruding from door 22 toward frame 20. As shown in FIGS. 12 and 13, an exemplary embodiment of a third latch 56 includes a third latch handle 62. Third latch handle 62 extends from the face of door 22 and provides a structure for a user to manipulate to activate third latch 56. In this embodiment, third latch handle 62 includes a knob that is moveable up and down along a third latch track defined in door 22. Third latch handle 62 operates third latch bolt 54 between an unlocked position and a locked position, as seen in FIG. 13. In the locked position, third latch bolt 54 engages door frame 20 at a third latch location 58. Third latch location 58 is defined along bottom frame section 72 on frame 22 in some embodiments. As shown in FIG. 13, third latch bolt 54 slides downwardly toward frame 20, when third latch handle 62 is operated while the door 22 is in a closed position. Third latch bolt 54 may be slid into a local opening, or third latch recess 60, defined in frame 20. Third latch recess 60 defines a space shaped to accommodate a portion of third latch bolt 54. When third latch bolt 54 is received in third latch recess 60, third latch bolt 54 interferes mechanically with frame 20 in the event door 22 is attempted to be opened. In this capacity, third latch bolt 54 operates as a lock to prevent door 22 from being opened relative to frame 20. When third latch 56 is released by sliding third latch handle 62 away from frame 20, third latch bolt 54 retracts from third latch recess 60 and moves to an unlocked position. Third latch 56 may be operated independently of first latch 26 and second latch 36.

In some embodiments, it is suitable to use first latch 26 as the only latch to secure door 22 in a closed position relative to door frame 20. A user may selectively open first latch 26, causing first latch bolt 34 to disengage from door frame 22 or from a strike plate 78 on door frame 20. A user may then close door 22 using only first latch 26 and first latch bolt 34 to engage a corresponding first latch location on door frame 22 or strike plate 78.

Figure 8:
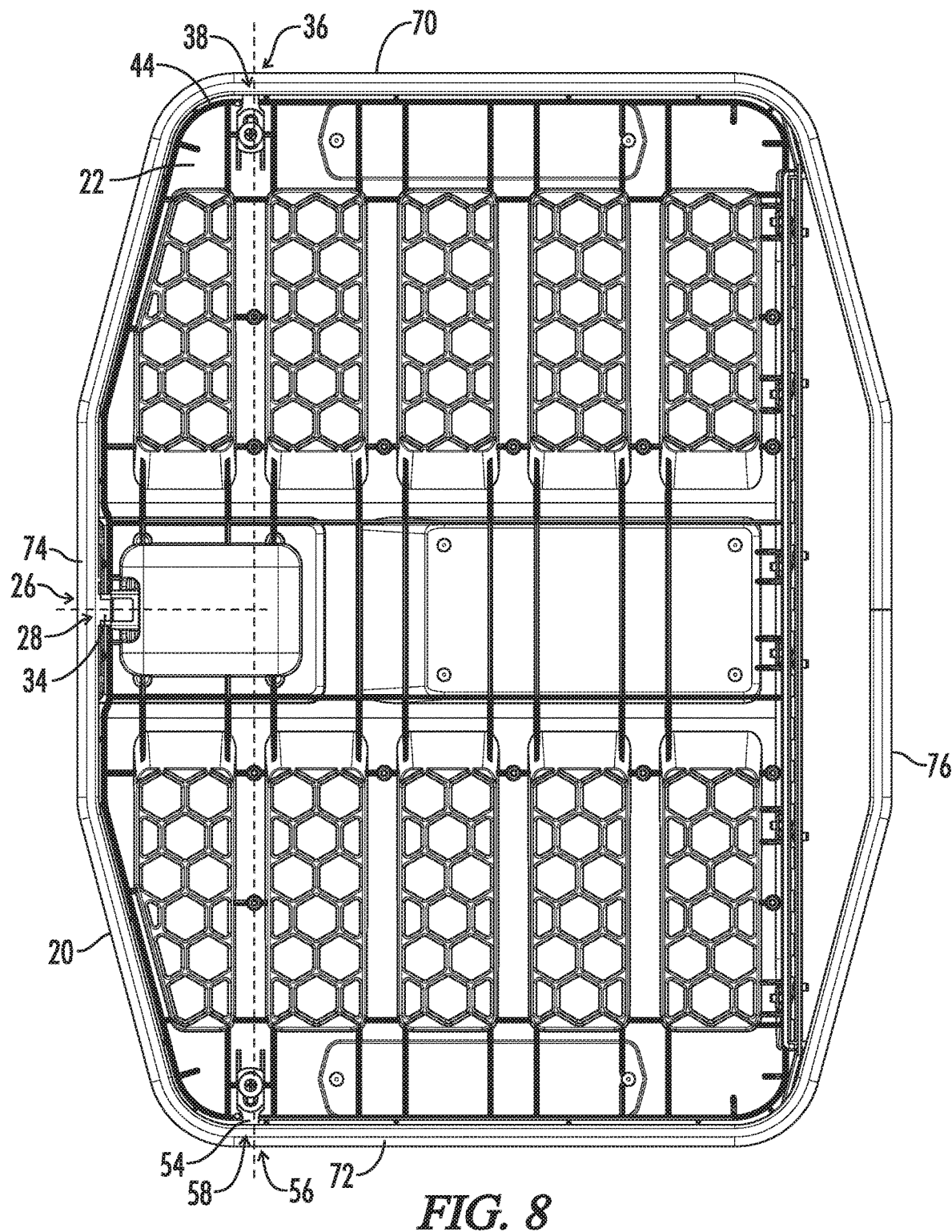
FIG. 8 is a rear elevation view of an embodiment of a door assembly in accordance with the present disclosure.

However, in other applications it is beneficial for door 22 to be more securely latched to frame 22 at more than one location to prevent door 22 from inadvertently opening during use. For example, while transporting an animal inside the enclosure 10 it is desirable to include multiple latches between door 22 and door frame 20 to achieve a better engagement between door 22 and frame 20. As shown in FIG. 8, in some embodiments the placement of the first latch 26, second latch 36 and third latch 56 provides an improved securement between the door 22 and door frame 20.

As shown in FIGS. 8-11, in some embodiments, door frame 20 includes a hoop-shaped structure including a top frame section 70 positioned along the top edge of the door frame, a bottom frame section 72 positioned along the bottom edge of the door frame, a latch side frame section 74 positioned on the side of the door frame where first latch 26 engages the door frame, and a hinge side frame section 76 positioned on the side of the door frame where the hinge between the door and the door frame is located. In some embodiments, first latch 26 includes a first latch bolt 34 engaging the door frame 22 at a first latch location 28 on the latch side frame section 74. The second latch 36 includes a second latch bolt 44 engaging the door frame 22 at a second latch location 38 on the top frame section 70. The third latch 56 includes a third latch bolt 54 engaging the door frame 22 at a third latch location 58 on the bottom frame section 72. In some configurations, first latch bolt 34 is equidistant between the second latch bolt 44 and the third latch bolt 54.

Figure 11:
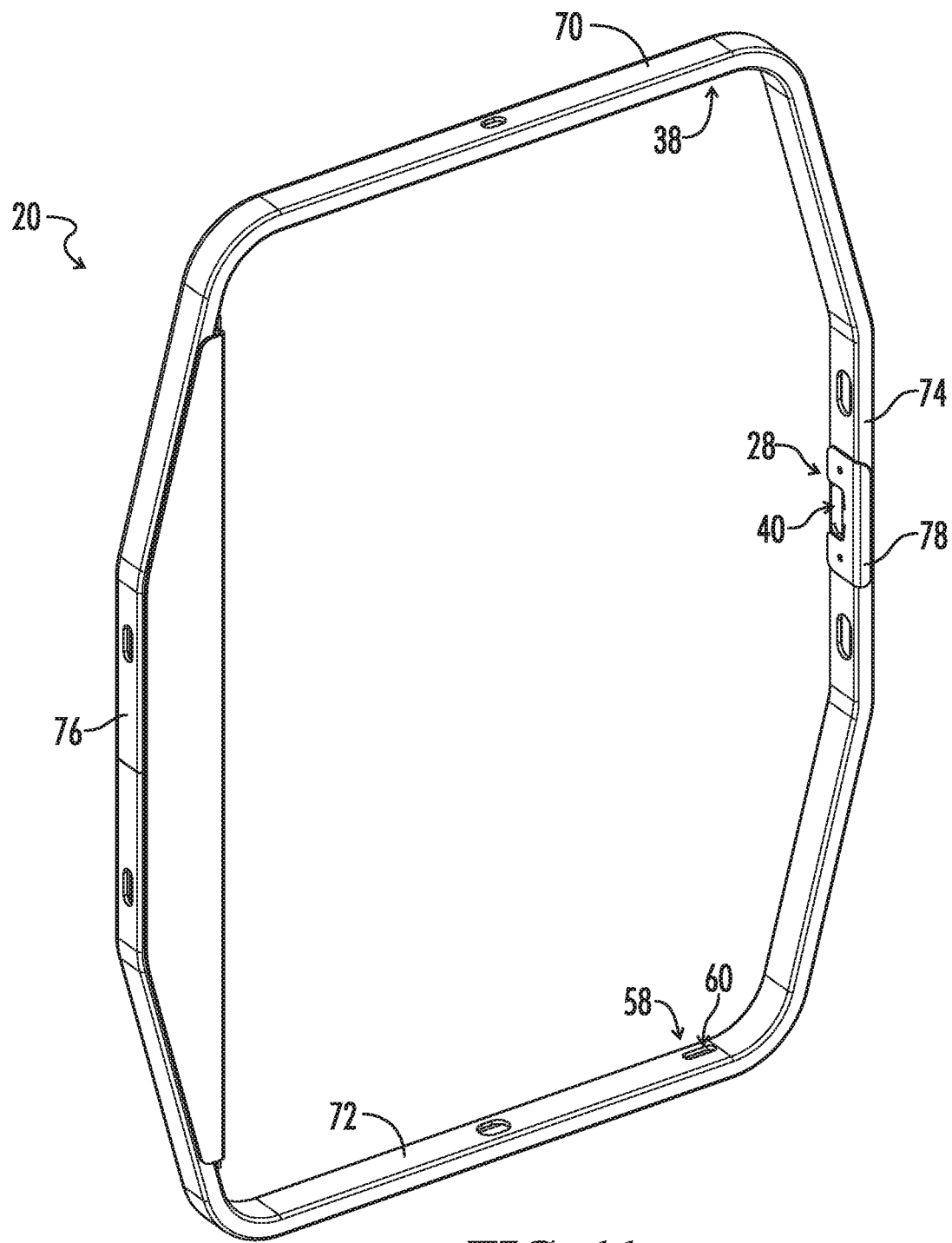
FIG. 11 is a perspective view of an embodiment of a door frame for use with a door assembly in accordance with the present disclosure.

First latch 26 includes a first latch bolt 34 that is moveable between a locked position and an unlocked position. When first latch bolt 34 is in a locked, or closed, position, first latch bolt 34 engages a corresponding structure on frame 20 at first latch location 28. For example, as shown in FIG. 11, a first latch recess 40 is defined in frame 20. First latch recess 40 defines a space where first latch bolt 34 is received when first latch 26 is in a locked position. As such, when door 22 is closed relative to frame 22, first latch bolt 34 extends partially into first latch recess 40 and provides a mechanical interference with frame 20 in the event door 22 is pushed or pulled, thereby keeping door 22 in a closed position. When first latch 26 is manipulated by a user to an open, or unlocked, position, first latch bolt 34 retracts from first latch recess 40 and allows door 22 to be opened relative to frame 20.

In some embodiments, a strike plate 78 is positioned on frame 20. Strike plate 78 includes a flat plate having a central opening. First latch bolt 34 partially extends through the central opening in strike plate 78 to achieve an engagement suitable to hold door 22 in a closed position relative to frame 20.

Figure 9:
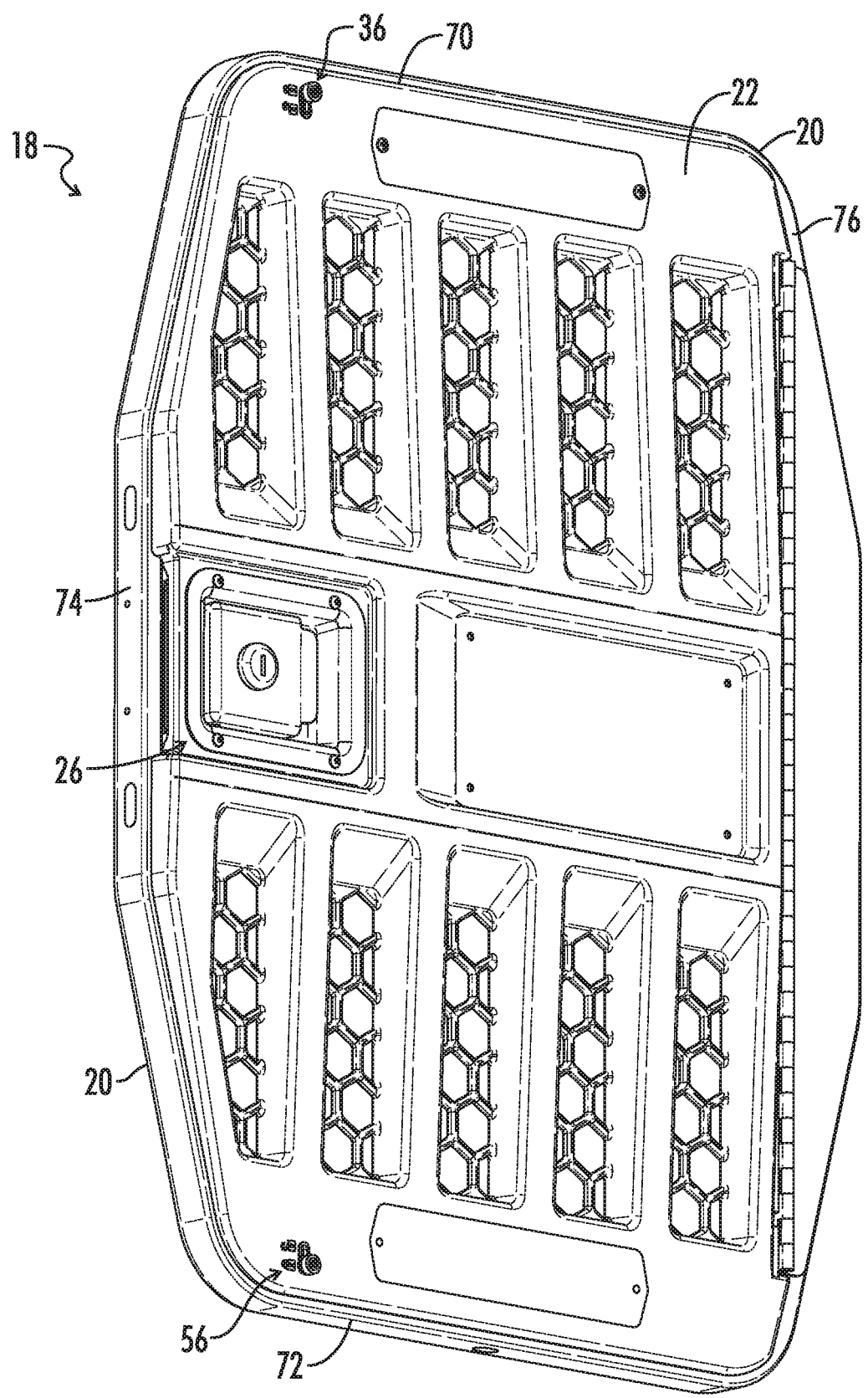
FIG. 9 is a front perspective view of an embodiment of a door assembly in accordance with the present disclosure.
Figure 10:
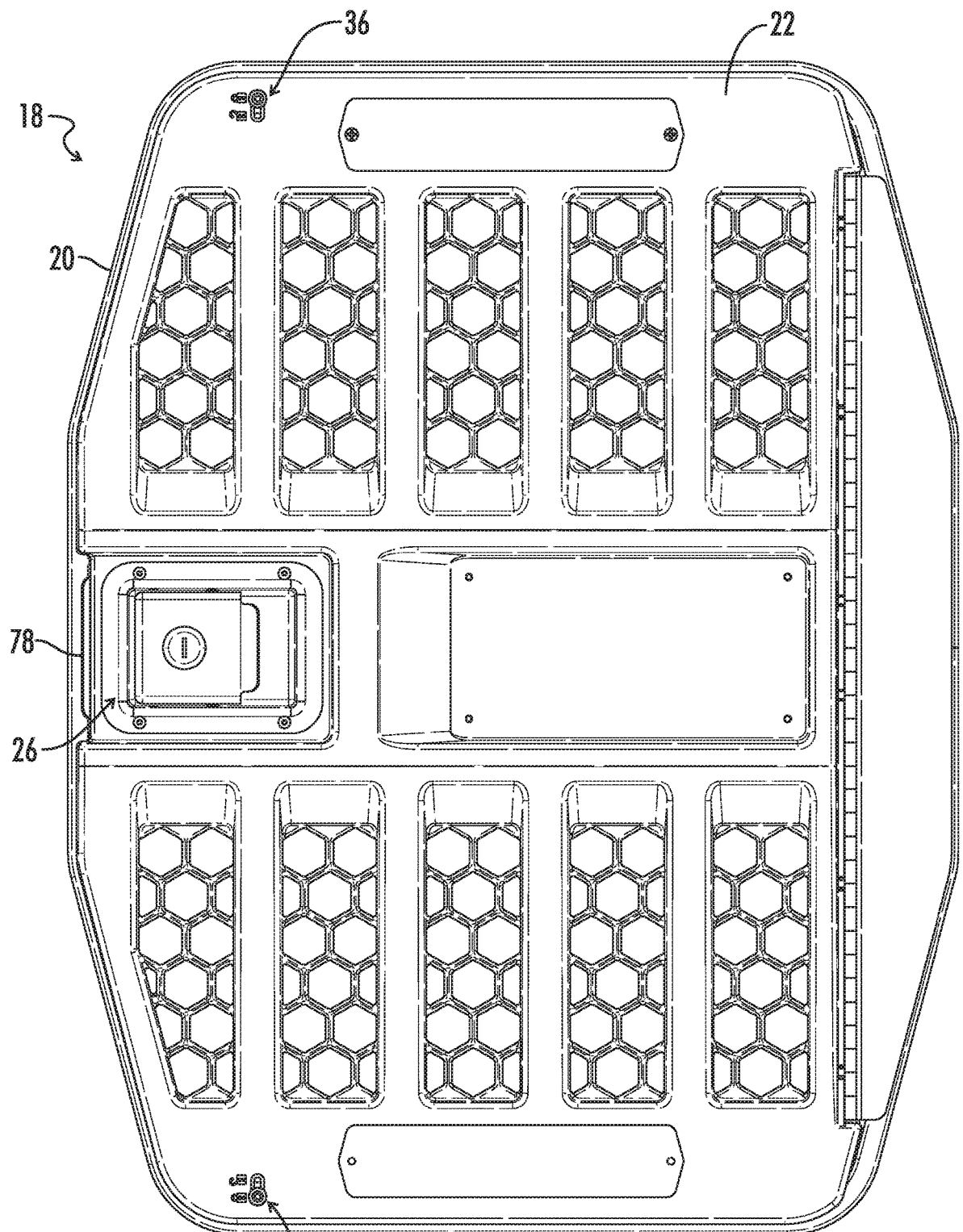
FIG. 10 is a front view of an embodiment of a door assembly in accordance with the present disclosure.

As shown in FIG. 1 and FIG. 3, door assembly 18 is oriented such that the first latch 26 is generally oriented on the right hand side of the animal enclosure 10 when viewing the animal enclosure 10 from the front. When oriented in this configuration, the door 22 and frame 20 are positioned in an upright orientation as seen in FIG. 3 with first latch 26 on the right side and hinge 24 on the left side of the kennel body. Because first latch bolt 34, second latch bolt 44 and third latch bolt 54 all engage frame 20, none of the latch bolt engagements require a specific engagement location on the kennel body around the perimeter of opening 16. As such, the door assembly 18 of the present disclosure may be rotated one-hundred-eighty degrees such that first latch 26 is on the left side of door assembly 18 for mounting on the kennel body, as shown in FIG. 9 and FIG. 10. This unique feature of the door assembly 18 allows the door assembly 18 to retain three latch locations in with first latch 26 on the right side for a right hand open as shown in FIG. 1 or on the left side for a left hand open as shown in FIG. 10.

Figure 14:
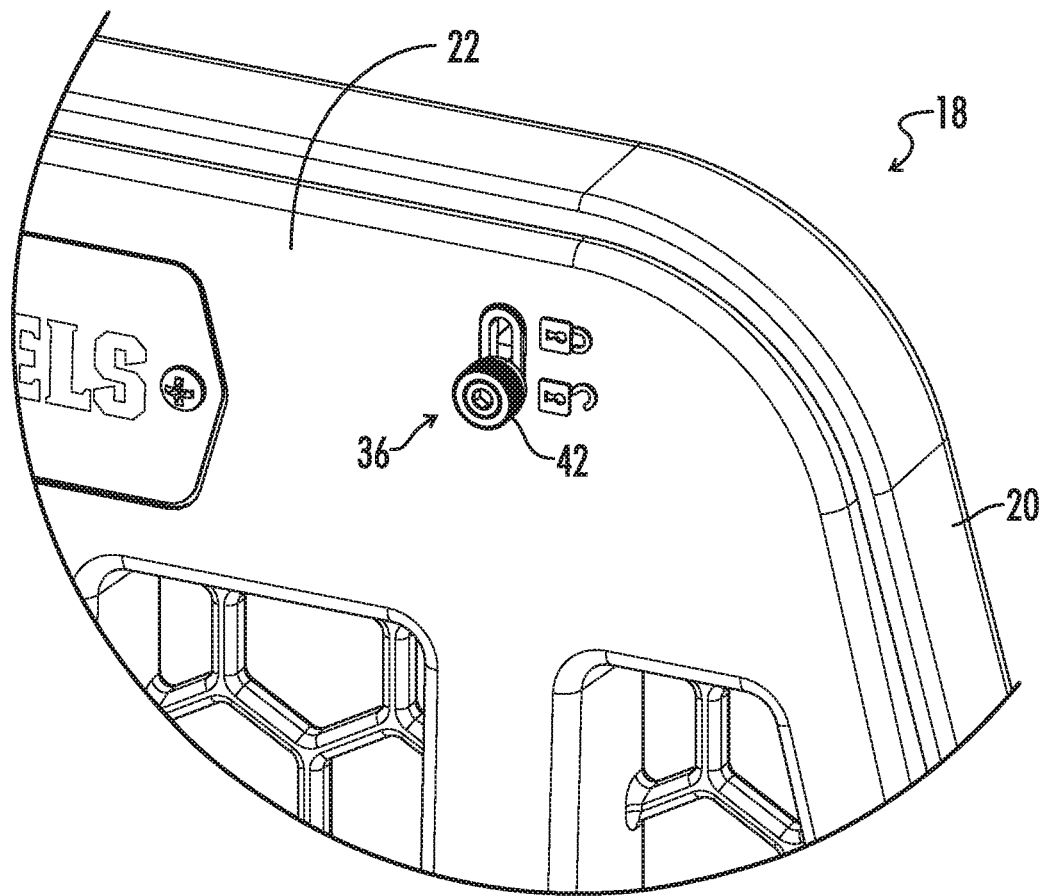
FIG. 14 is a front perspective view of an embodiment of a door assembly in accordance with the present disclosure.
Figure 15:
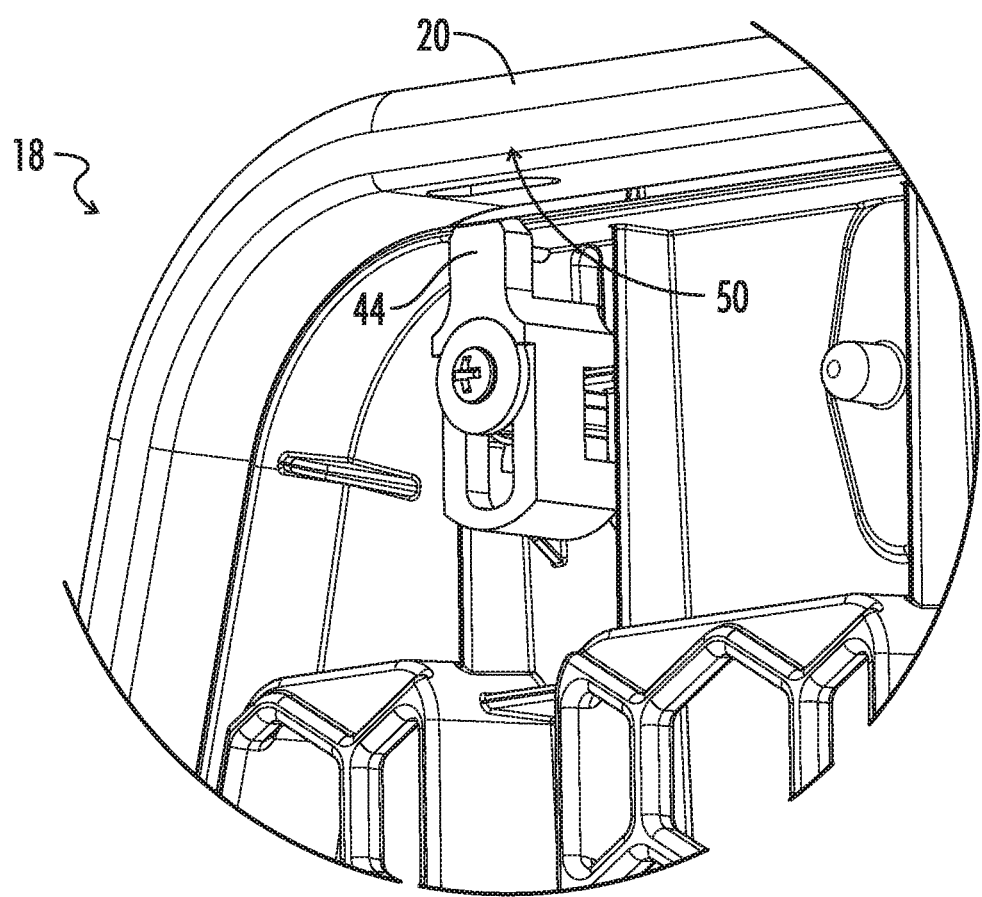
FIG. 15 is a rear perspective view of an embodiment of a door assembly in accordance with the present disclosure.

In some embodiments, first latch 26 includes a biasing member such that first latch bolt 34 is biased toward first latch recess 40 when door 22 is in a closed position. Additionally, second and third latches 36, 56 are not biased in either an open or closed configuration in some embodiments. For example, when second latch 36 is in an unlocked position, second latch bolt 44 is fully retracted from second latch recess 50, as shown in FIGS. 14 and 15. If a user engages second latch handle 42 and presses it toward frame 20, then second latch bolt 44 travels toward and enters second latch recess 50, placing second latch 36 in a locked position. Second latch 36 will remain in a locked position until a user manually engages second latch handle 42 and slides it away from frame 20, retracting second latch bolt 44 from second latch recess 50, and placing second latch 36 back in an unlocked position.

Similarly, when third latch 56 is in an unlocked position, third latch bolt 54 is fully retracted from third latch recess 60. If a user engages third latch handle 62 and presses it toward frame 20, then third latch bolt 54 travels toward and enters third latch recess 60, placing third latch 56 in a locked position. Third latch 56 will remain in a locked position until a user manually engages third latch handle 62 and slides it away from frame 20, retracting third latch bolt 54 from third latch recess 60, an placing third latch 56 back in an unlocked position.

Thus, although there have been described particular embodiments of the present invention of a new and useful ANIMAL ENCLOSURE AND DOOR ASSEMBLY, it is not intended that such references be construed as limitations upon the scope of this invention.

What is claimed is:

1. An animal enclosure apparatus, comprising:
   a kennel body;
   a door opening defined on the kennel body;
   a door frame comprising a hoop-shaped structure disposed on the kennel body at the door opening, the door frame secured to the kennel body using a plurality of door frame fasteners;
   a pivoting door hinge disposed on the door frame;
   a door disposed on the pivoting door hinge, wherein the door is pivotally attached to the door frame via the pivoting door hinge and is moveable relative to the door frame between a closed position and an open position;
   a first latch disposed on the door, the first latch including a first latch handle and a first latch bolt, the first latch bolt extending from the door toward the door frame and engaging the door frame at a first latch location when the door is in the closed position, wherein the first latch handle is operable to move the first latch bolt relative to the door frame, the first latch providing an engagement between the door and the door frame, the first latch bolt extending and retracting in a substantially horizontal orientation;
   a second latch disposed on the door, the second latch including a second latch handle and a second latch bolt, the second latch bolt engaging the door frame at a second latch location different from the first latch location, wherein the second latch bolt is selectively moveable between a locked and an unlocked position via the second latch handle, the second latch providing an auxiliary engagement between the door and the door frame, and wherein the second latch handle is spaced above the first latch handle; and
   a third latch disposed on the door, the third latch including a third latch handle and a third latch bolt, the third latch bolt engaging the door frame at a third latch location different from the first and second latch locations, wherein the third latch bolt is selectively moveable between a locked and an unlocked position via the third latch handle, the third latch providing an auxiliary engagement between the door and the door frame, and wherein the third latch handle is spaced below the first latch handle,
   wherein the first latch includes a biasing member operable to bias the first latch bolt away from the door such that operation of the first latch is required for opening and closing the door,
   wherein the second and third latches are auxiliary latches that are each operated independently of all other latches, and
   wherein the door will not open if any one of the first, second, or third latch is in its locked position.

2. The apparatus of claim 1, further comprising a first latch recess defined in the door frame at the first latch location.

3. The apparatus of claim 2, wherein the first latch bolt protrudes into the first latch recess when the first latch is in its locked position and when the door is in the closed position.

4. The apparatus of claim 3, further comprising a second latch recess defined in the door frame at the second latch location.

5. The apparatus of claim 4, wherein the second latch bolt protrudes into the second latch recess when the second latch bolt is in its locked position.

6. The apparatus of claim 5, wherein the second latch bolt is fully retracted from the second latch recess when the second latch bolt is in its unlocked position.

7. The apparatus of claim 5, further comprising a third latch recess defined in the door frame at the third latch location.

8. The apparatus of claim 7, wherein the third latch bolt protrudes into the third latch recess when the third latch bolt is in its locked position.

9. The apparatus of claim 8, wherein the third latch bolt is fully retracted from the third latch recess when the third latch bolt is in its unlocked position.

10. The apparatus of claim 8, further comprising a strike plate disposed on the door frame, wherein the first latch bolt engages the strike plate when the door is in the closed position.

11. The apparatus of claim 1, wherein the second latch and the third latch are further disposed on the door equidistant from the first latch.

12. An animal enclosure apparatus, comprising:
   an animal enclosure;
   a hoop-shaped door frame disposed on the animal enclosure using a plurality of door frame fasteners, the door frame including a top frame section, a bottom frame section, a latch side frame section between the top and bottom frame sections, and a hinge side frame section between the top and bottom frame sections opposite the latch side frame section;
   a pivoting hinge disposed on the door frame on the hinge side frame section;
   a door attached to the pivoting hinge on the door frame, wherein the door is moveable relative to the door frame via the pivoting hinge between an open position and a closed position;
   a first latch on the door, the first latch including a first latch handle and a first latch bolt, wherein the first latch bolt engages the door frame at a first latch location;

a second latch on the door, the second latch including a second latch handle and a second latch bolt, wherein the second latch bolt engages the door frame at a second latch location different from the first latch location, and wherein the second latch handle is spaced above the first latch handle;

a third latch on the door, the third latch including a third latch handle and a third latch bolt, wherein the third latch bolt engages the door frame at a third latch location different from the first and second latch locations, and wherein the third latch handle is spaced below the first latch handle.

13. The apparatus of claim 12, wherein the first latch location is on the latch side frame section of the door frame.

14. The apparatus of claim 13, wherein the second latch location is on the top frame section of the door frame.

15. The apparatus of claim 14, wherein the third latch location is on the bottom frame section of the door frame.

16. The apparatus of claim 15, wherein the first latch bolt extends toward the door frame in a substantially horizontal orientation.

17. The apparatus of claim 16, wherein the second and third latch bolts extend toward the door frame in a substantially vertical orientation.

18. An animal enclosure, comprising:
a kennel body defining an opening;
a door assembly including a hoop-shaped door frame attached to the kennel body at the opening, a pivoting hinge attached to the door frame, and a door pivotally attached to the door frame via the pivoting hinge, the door moveable between an open position and a closed position;
a first latch disposed on the door, the first latch including a first latch bolt extending toward the door frame;
a first latch recess defined in the door frame, the first latch recess positioned to partially receive the first latch bolt when the door is in the closed position;
a second latch disposed on the door, the second latch including a second latch bolt extending toward the door frame, the second latch bolt moveable between a locked and an unlocked position, wherein the second latch is spaced above the first latch;
a second latch recess defined in the door frame, the second latch recess positioned to partially receive the second latch bolt when the second latch bolt is in the locked position;
a third latch disposed on the door, the third latch including a third latch bolt extending toward the door frame, the third latch bolt moveable between a locked and an unlocked position, wherein the third latch is spaced below the first latch; and
a third latch recess defined in the door frame, the third latch recess positioned to partially receive the third latch bolt when the third latch bolt is in the locked position.

19. The apparatus of claim 18, wherein the first latch bolt is biased toward the door frame.

20. The apparatus of claim 19, wherein:
the first latch includes a first latch handle disposed on the door, the first latch handle connected to the first latch bolt and operable to manipulate the first latch bolt toward and away from the first latch recess;
the second latch includes a second latch handle disposed on the door connected to the second latch bolt, the second latch handle operable to manipulate the second latch bolt toward and away from the second latch recess; and
the third latch includes a third latch handle disposed on the door connected to the third latch bolt, the third latch handle operable to manipulate the third latch bolt toward and away from the third latch recess.

21. The apparatus of claim 20, wherein:
the second latch handle being disposed on the door comprises the second latch handle extending from a face of the door;
the second latch handle is movable along a first latch track defined in the face of the door;
the third latch handle being disposed on the door comprises the third latch handle extending from the face of the door; and
the third latch handle is movable along a second latch track defined in the face of the door.

22. The apparatus of claim 21, wherein the second and third latch bolts are disposed on an interior side of the door, wherein the interior side of the door is disposed opposite the face of the door.

23. The apparatus of claim 20, wherein:
the first latch bolt extends toward the door frame in a substantially horizontal orientation; and
the second and third latch bolts extend toward the door frame in a substantially vertical orientation.

* * * * *